(12) United States Patent
Leu

(10) Patent No.: US 7,301,706 B2
(45) Date of Patent: Nov. 27, 2007

(54) COMPLEX LENS

(75) Inventor: Charles Leu, Fullerton, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/288,898

(22) Filed: Nov. 29, 2005

(65) Prior Publication Data

US 2006/0132926 A1 Jun. 22, 2006

(30) Foreign Application Priority Data

Dec. 17, 2004 (CN) .................. 2004 2 0103110

(51) Int. Cl.
*G02B 3/00* (2006.01)
(52) U.S. Cl. .............. 359/642; 359/664; 359/708
(58) Field of Classification Search ........ 359/642, 359/651, 664, 708, 741, 796, 166
See application file for complete search history.

(56) References Cited

U.S. PATENT DOCUMENTS 4,052,520 A * 10/1977 Chang et al. ............ 427/164
4,268,134 A * 5/1981 Gulati et al. ............ 351/163
5,825,549 A * 10/1998 Kawamata et al. ........ 359/582
6,250,758 B1 * 6/2001 Yoshihara et al. ......... 351/163
2005/0231812 A1 * 10/2005 Leu et al. ............... 359/642

* cited by examiner

*Primary Examiner*—Scott J. Sugarman
*Assistant Examiner*—Darryl J. Collins
(74) *Attorney, Agent, or Firm*—Morris Manning Martin LLP; Tim Tingkang Xia, Esq.

(57) ABSTRACT

An embodiment of a complex lens (1) includes a central substrate (10), two opposite glass layers (12), and two opposite IR-cut layers (13). The substrate is made of transparent plastic, such as polycarbonate or polymethyl methacrylate. The glass layers are deposited on opposite surfaces of the substrate. The IR-cut layers are deposited on surfaces of the glass layers. The substrate has a spherical or an aspheric surface. The IR-cut layers have a function of filtering infrared rays, thereby improving the image-forming quality of the complex lens. The substrate is typically made of polycarbonate or polymethyl methacrylate. The glass layers are typically made of $ZrO_2$—$Y_2O_3$ or SiC. Each IR-cut layer includes a plurality of films of $Ti_2O_3$ and $SiO_2$.

17 Claims, 2 Drawing Sheets

FIG. 2

| layer | material | thickness (nm) | layer | material | thickness (nm) | layer | material | thickness (nm) |
|---|---|---|---|---|---|---|---|---|
| 1 | Ti₂O₃ | 13.08 | 12 | Ti₂O₃ | 98.68 | 23 | Ti₂O₃ | 79.15 |
| | SiO₂ | 10.42 | | SiO₂ | 145.74 | | SiO₂ | 133.58 |
| 2 | Ti₂O₃ | 86.26 | 13 | Ti₂O₃ | 83.42 | 24 | Ti₂O₃ | 77.17 |
| | SiO₂ | 10.32 | | SiO₂ | 152.25 | | SiO₂ | 133.15 |
| 3 | Ti₂O₃ | 14.28 | 14 | Ti₂O₃ | 23.33 | 25 | Ti₂O₃ | 76.92 |
| | SiO₂ | 150.54 | | SiO₂ | 7.85 | | SiO₂ | 133.61 |
| 4 | Ti₂O₃ | 13.72 | 15 | Ti₂O₃ | 90.61 | 26 | Ti₂O₃ | 77.06 |
| | SiO₂ | 4.66 | | SiO₂ | 15.13 | | SiO₂ | 135.36 |
| 5 | Ti₂O₃ | 82.94 | 16 | Ti₂O₃ | 24.62 | 27 | Ti₂O₃ | 72.22 |
| | SiO₂ | 33.94 | | SiO₂ | 158.8 | | SiO₂ | 8.00 |
| 6 | Ti₂O₃ | 10.44 | 17 | Ti₂O₃ | 84.32 | 28 | Ti₂O₃ | 5.11 |
| | SiO₂ | 182.58 | | SiO₂ | 140.61 | | SiO₂ | 125.76 |
| 7 | Ti₂O₃ | 8.58 | 18 | Ti₂O₃ | 85.85 | 29 | Ti₂O₃ | 82.67 |
| | SiO₂ | 26.93 | | SiO₂ | 21.51 | | SiO₂ | 136.5 |
| 8 | Ti₂O₃ | 89.37 | 19 | Ti₂O₃ | 5.55 | 30 | Ti₂O₃ | 18.52 |
| | SiO₂ | 150.11 | | SiO₂ | 180.24 | | SiO₂ | 6.47 |
| 9 | Ti₂O₃ | 82.5 | 20 | Ti₂O₃ | 12.08 | 31 | Ti₂O₃ | 56.9 |
| | SiO₂ | 16.02 | | SiO₂ | 36.51 | | SiO₂ | 74.58 |
| 10 | Ti₂O₃ | 9.01 | 21 | Ti₂O₃ | 81.83 | | | |
| | SiO₂ | 174.39 | | SiO₂ | 5.2 | | | |
| 11 | Ti₂O₃ | 12.93 | 22 | Ti₂O₃ | 8.80 | | | |
| | SiO₂ | 35.64 | | SiO₂ | 134.86 | | | |

COMPLEX LENS

BACKGROUND OF THE INVENTION

1. Field of the Invention

The present invention generally relates to optical lenses, and more particularly to a complex optical lens.

2. Related Art

Currently, digital camera modules are included as a feature in a wide variety of portable electronic devices. Most portable electronic devices are becoming more miniaturized over time, and digital camera modules are correspondingly becoming smaller. Nevertheless, in spite of the small size of contemporary digital camera modules, consumers still demand excellent imaging. The image quality of a digital camera is mainly dependent upon the optical elements of the digital camera module.

Aspheric lenses are very important elements in a typical digital camera module. An aspheric lens can easily focus an image on an imaging point, because the aspheric lens can attain different refractive indexes via the selection of different materials and profiles for the aspheric lens. Therefore, an aspheric lens can avoid many of the image-forming problems of spherical lenses. In addition, with a single aspheric lens, the number of lens pieces in a camera is reduced. Thus the camera can have a reduced size. Two or more aspheric lenses are used in some cameras for high-quality image forming. Contemporary aspheric lenses are essentially made of glass or plastic.

Glass aspheric lenses are generally manufactured by way of glass molding. A glass molding machine operates at a high temperature and high pressure during the glass molding process. Therefore, core inserts are needed, and these must be accurately designed and manufactured. The core inserts should have excellent chemical stability in order not to react with the glass material. In addition, the core inserts also should have enough rigidity and excellent mechanical strength in order not to be scratched. Furthermore, the core inserts should be impact-resistant at high temperatures and under high pressures. Moreover, the core inserts should have excellent machinability in order that they may be machined precisely and easily to form the desired optical surfaces. Finally, the core inserts should have a long working lifetime so that the cost of manufacturing aspheric lenses is kept to a minimum. However, a typical contemporary core insert generally has a short working lifetime, which escalates the cost of producing aspheric lenses.

Plastic aspheric lenses are generally manufactured by way of injection molding. Though the cost of plastic aspheric lenses is relatively low, a plastic aspheric lens has a low image-forming quality compared to a glass aspheric lens. This difference in quality is due to the transparent quality of plastic being less than that of glass.

What is needed is an optical lens which has a lower cost and a better image-forming quality.

SUMMARY

A complex lens includes a substrate, a glass layer, and an IR-cut (infrared-cut) layer. The substrate is made of transparent plastic, such as polycarbonate or polymethyl methacrylate. The glass layer is deposited on a surface of the substrate. The IR-cut layer is deposited on a surface of the glass layer. The substrate has a spherical or an aspheric surface. The substrate comprises a material selected from the group consisting of polycarbonate and polymethyl methacrylate. The glass layer comprises a material of $ZrO_2$—$Y_2O_3$ or SiC. The IR-cut layer comprises a plurality of films of $Ti_2O_3$ and $SiO_2$. In a preferred embodiment, the complex lens includes a central substrate, two opposite glass layers, and two opposite IR-cut layers.

Other advantages and novel features will become more apparent from the following detailed description when taken in conjunction with the accompanying drawings.

BRIEF DESCRIPTION OF THE DRAWINGS

Many aspects of the complex lens can be better understood with reference to the following drawings. The components in the first drawing are not necessarily to scale, the emphasis instead being placed upon clearly illustrating the principles of the complex lens.

FIG. 2 is a material-thickness table of each of the IR-cut layers of FIG. 1.

DETAILED DESCRIPTION OF THE EMBODIMENTS

Figure 1:
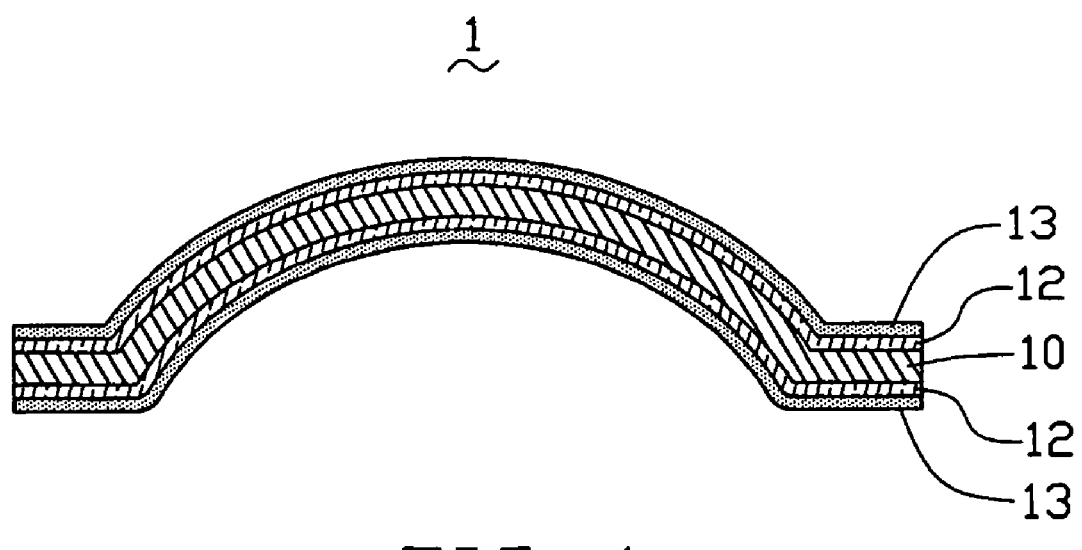
FIG. 1 is a cross-sectional view of a complex lens in accordance with a preferred embodiment of the present invention, the complex lens including two glass layers and two IR-cut layers.

Referring to FIG. 1, in a preferred embodiment of the present invention, a complex lens 1 includes a central substrate 10, two opposite glass layers 12, and two opposite IR-cut layers 13.

The substrate 10 is made of a transparent plastic material. The transparent plastic can be polycarbonate or polymethyl methacrylate. The substrate 10 has a concave surface and a convex surface, and preferably has a substantially uniform thickness. The concave surface can be either a spherical surface or an aspheric surface, and the convex surface can be either a spherical surface or an aspheric surface. The glass layers 12 are made of a glass material, such as $ZrO_2$—$Y_2O_3$ or SiC. The IR-cut layers 13 are each made of a plurality of complex films of $Ti_2O_3$ and $SiO_2$. A preferred number of complex films of $Ti_2O_3$ and $SiO_2$ is in the range of 25-35. FIG. 2 shows preferred thicknesses of the complex films. The glass layers 12 are deposited on two opposite surfaces of the substrate 10, and the IR-cut layers 13 are deposited on surfaces of the two glass layers 12 respectively. The glass material has better transparency than the plastic material. In the preferred embodiment, the glass material is comprised of $ZrO_2$—$Y_2O_3$ or SiC, each of which has a low thermal expansion coefficient. The IR-cut layers 13 can filter out infrared rays that may diminish the image-forming quality of the complex lens 1.

It is understood that in an alternative embodiment, the complex lens can have only one glass layer 12, and one IR-cut layer 13 deposited on a surface of the glass layer 12.

Referring to FIG. 1, a method for manufacturing the complex lens 1 comprises the steps of:

providing an injection mold, the injection mold having a spherical or an aspheric surface;

injecting transparent plastic into the injection mold, and forming a substrate 10 having a spherical or an aspheric surface at either or both of opposite sides thereof, the transparent plastic being polycarbonate or polymethyl methacrylate;

depositing a glass layer 12 on each of two opposite surfaces of the substrate 10 in a vacuum chamber by means of sputtering, the glass layers 12 being made of $ZrO_2$—$Y_2O_3$ or SiC; and depositing IR-cut layers 13 on the surfaces of the glass layers 12 in a vacuum chamber by means of sputtering, the IR-cut layers 13 each having a plurality of complex films of $Ti_2O_3$ and $SiO_2$.

The glass layers 12 and the IR-cut layers 13 can also be deposited by other methods of vacuum deposition, such as physical vapor deposition, chemical vapor deposition, or vacuum evaporation.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A complex lens, comprising:
    a substrate made of transparent plastic;
    a glass layer formed on a surface of the substrate; and
    an infrared-cut (IR-cut) layer deposited on a surface of the glass layer;
    wherein the substrate comprises a spherical or an aspheric surface.

2. The lens as claimed in claim 1, wherein the substrate comprises a material selected from the group consisting of polycarbonate and polymethyl methacrylate.

3. The lens as claimed in claim 1, wherein the glass layer comprises $ZrO_2$—$Y_2O_3$.

4. The lens as claimed in claim 1, wherein the glass layer comprises SiC.

5. The lens as claimed in claim 1, wherein the IR-cut layer comprises a plurality of films of $Ti_2O_3$ and $SiO_2$.

6. The lens as claimed in claim 5, wherein the IR-cut layer has 25-35 films of $Ti_2O_3$ and $SiO_2$ in total.

7. The complex lens as claimed in claim 1, wherein the substrate has a concave surface and a convex surface.

8. The complex lens as claimed in claim 1, further comprising another glass layer deposited on an opposite surface of the substrate.

9. The complex lens as claimed in claim 8, futher comprising another IR-cut layer deposited on a surface of said another glass layer.

10. A lens assembly comprising:
    a substrate of said lens assembly;
    a glass layer laid on at least one surface of said substrate; and
    at least one layer laid on said glass layer for improving optical capability of said lens assembly;
    wherein said glass layer comprises SiC.

11. The lens assembly as claimed in claim 10, wherein said at least one layer on said glass layer is an infrared-cut (IR-cut) layer.

12. The lens assembly as claimed in claim 11, wherein the IR-cut layer comprises a plurality of films of $Ti_2O_3$ and $SiO_2$.

13. The lens assembly as claimed in claim 10, wherein said substrate is made of a plastic material selected from the group consisting of polycarbonate and polymethyl methacrylate.

14. A method for manufacturing a lens assembly, comprising the steps of:
    molding a substrate of said lens assembly to form at least one desired surface thereon;
    forming a glass layer on said at least one surface of said substrate; and
    forming at least one light-treating layer on said glass layer for improving optical capability of said lens assembly;
    wherein at least one of said glass layer and said at least one light-treating layer formed by at least one process selected from the group consisting of vacuum deposition, vacuum sputtering, physical vapor deposition, chemical vapor deposition, and vacuum evaporation.

15. The method for manufacturing a lens assembly as claimed in claim 14, wherein said glass layer comprises SiC.

16. The method for manufacturing a lens assembly as claimed in claim 14, wherein said at least one light-treating layer on said glass layer is an infrared-cut (IR-cut) layer.

17. The method for manufacturing a lens assembly as claimed in claim 16, wherein said IR-cut layer comprises a plurality of films of $Ti_2O_3$ and $SiO_2$.

* * * * *